April 13, 1954  E. H. MUELLER  2,675,207
VALVE FOR CONTROLLING FUEL GAS
Filed Oct. 27, 1952  2 Sheets-Sheet 1

INVENTOR.
ERVIN H. MUELLER
BY
Barnes, Kisselle, Laughlin & Raisch
ATTORNEYS.

April 13, 1954
E. H. MUELLER
2,675,207
VALVE FOR CONTROLLING FUEL GAS
Filed Oct. 27, 1952
2 Sheets-Sheet 2
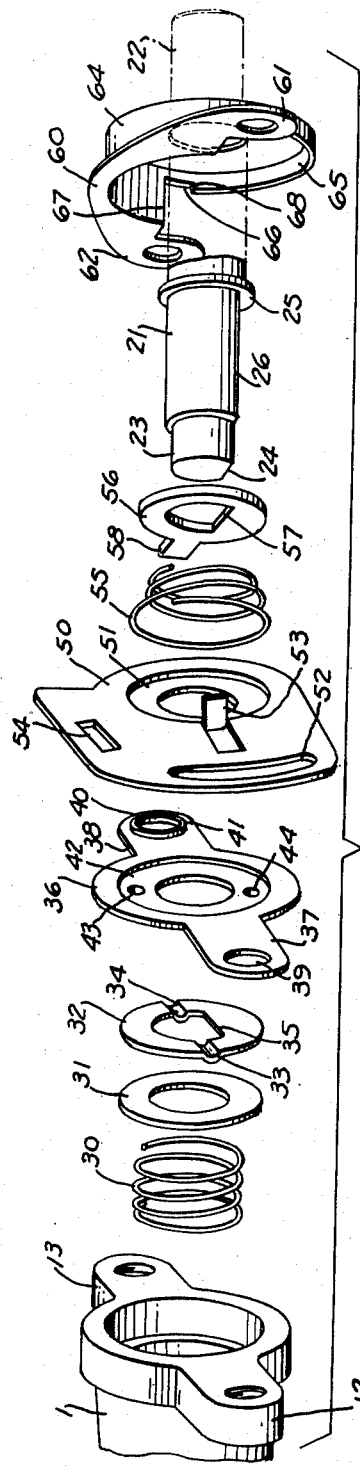
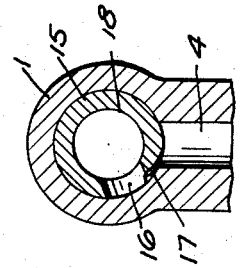
Fig. 9.
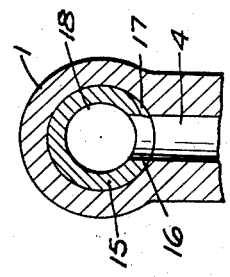
Fig. 8.
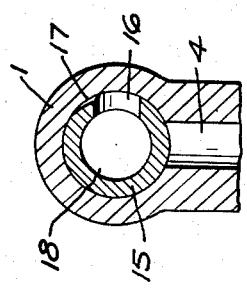
Fig. 7.
INVENTOR.
ERVIN H. MUELLER
BY
Barnes, Kisselle, Laughlin & Raisch
ATTORNEYS.

Patented Apr. 13, 1954

2,675,207

UNITED STATES PATENT OFFICE 2,675,207

VALVE FOR CONTROLLING FUEL GAS

Ervin H. Mueller, Grosse Pointe, Mich.

Application October 27, 1952, Serial No. 316,989

7 Claims. (Cl. 251—288)

1

This invention relates to a valve for controlling the flow of gaseous fuel to a gas burner.

The object of this invention is to provide an improved valve construction, particularly useful for the top burners of a gas range. The improved construction provides an arrangement for adjusting a limit stop for a rotary valve member so that when the valve member is turned to a position where its turning movement is stopped or limited there is a low gas flame for simmering or warming purposes. The position of the limit stop may be varied with facility so that a flame of determined size can be readily obtained. The improved construction also provides a valve which is locked in "off" position and thus is not liable to be accidently turned to an "on" position. The structure also provides an arrangement wherein an adjustable element cannot be bound in position when the valve structure is otherwise conditioned for adjusting the element to thereby adjustably position the limit stop.

A valve constructed in accordance with the invention is disclosed in the accompanying drawings:

Fig. 6 is a separated view showing the several elements of the valve structure.

Fig. 7 is a sectional view taken through the valve body and valve member illustrating the relative positions when the valve is "off".

Fig. 8 is a sectional view similar to Fig. 7 showing the full "on" position.

Fig. 9 is a sectional view similar to Figs. 7 and 8 showing the simmer position.

Figure 1:
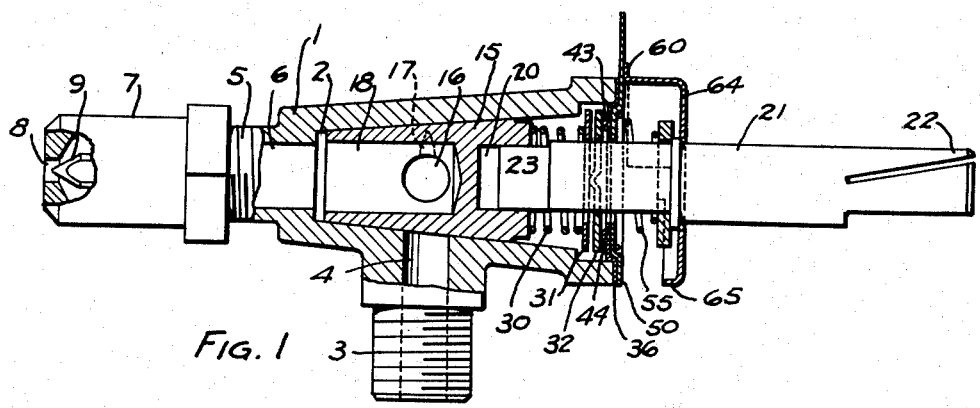
Fig. 1 is a general cross sectional view taken through a valve constructed in accordance with the invention.

A valve body 1 has a valve chamber 2 therein, a threaded extension 3 which has an inlet port 4 therein and a threaded extension 5 with an outlet passage 6 therein. The extension 5 may be provided with the usual hood 7 with an outlet orifice 8 and the hood is adjustable on the threads so that the orifice may be regulated by a needle member 9. The valve body has two wings 12 and 13 (Fig. 6) each provided with an internally threaded aperture.

A valve member 15 is situated in the chamber 2 and both the chamber and the valve member may be tapered, as shown. The valve member has a port 16 and a tail port extending therefrom as shown at 17, and an axial passage 18 which opens through the end of the valve member and communicates with the outlet passage 6. This valve member also has a recess or cavity 20. There is an operating stem 21 having one end 22 constructed to receive a suitable handle and an inner end portion 23 arranged to slidably and non-rotatably engage in the recess 20. For this purpose, the recess 20 and the extension 23 may be substantially of D-shape and thus the stem portion 23 has a flat side 24 fitting into the correspondingly shaped recess 20. The stem also has a fixed shoulder 25 thereon. The portion of the stem between the end part 23 and the shoulder 25 is also of D-shape in cross section having a flat side 26.

Possibly the constituent elements of the valve can be best appreciated by a consideration of Fig. 6 in conjunction with Fig. 1. There is a spring 30 which extends around the stem and engages the valve member; to the rear of this spring is a suitable anti-friction washer 31 and next to the washer 31 is a click washer 32 with opposite recesses 33 and 34 and a D-shaped opening therein thus providing a flat side 35 so that the washer is loosely keyed to the stem to rotate therewith. Next to the washer 32 is a click plate 36 with opposite extensions 37 and 38 apertured as at 39 and 40. The aperture 40 is defined by a boss 41. This click plate has a central aperture through which the stem passes and it has a centrally disposed cupped or recessed part 42. The plate also is formed with two projections 43 and 44 in the nature of teats, as shown in Fig. 1.

There is an adjusting plate 50 with a central depressed part 51 arranged to fit into and to be journalled in the recess 42 of the click plate. This adjusting plate has an arcuate slot 52 arranged to substantially register with the threaded aperture in the wing 12; it is provided with a limit stop 53 and an aperture 54 for receiving an instrument, such as a screw driver, by means of which it may be adjusted.

Outwardly of the plate 50 is a coil spring 55 advantageously of conical form, the large end of which seats against the plate 50. Outwardly of this spring is a washer 56 with a D-shaped opening having a flat side 57 fitting on the D-shape section of the stem and having a projection or finger 58. A cap 60 has apertured and oppositely disposed extensions or wings 61, 62 and a cupped central portion 64. The cupped portion 64 has a flange 65 provided with a recess 66 bounded on one side by a shoulder 67 and on the other side by a shoulder 68. When the parts are assembled they take the relative positions, as shown in Fig. 1, and are held in this position by screws 70 and 71 which pass through the openings 39 and 40 in the click plate 36 and into the threaded apertures of the ears 12 and 13 of the valve body. The spring 30 holds the valve on its seat and urges the click washer 32 toward the click plate 36. The spring 55 urges the washer 56 against the shoulder 25 of the stem and the shoulder 25 reacts against the cup 64 of the cap. The adjusting plate 50 lies between the cap and the click plate 36, the click plate lying against the body of the valve and screw 70 passes through the elongated aperture 52. The adjusting plate 50 is not symmetrical, as shown, as its body extends to one side so that its elongated aperture 52 is in registry with the screw threaded aperture in the wing 12 but the adjusting plate has no counter-part overlying the wing 13.

However, the boss 41 has an axial dimension which is preferably slightly greater than the thickness of the plate 50. As a result, when the screw 70 is tightened, the adjusting plate 50 is held bound in position. When the screw 71 is tightened, the wing 62 of the cap is tightened to the body with the interposed boss on the click plate but this does not affect the adjusting plate 50.

Figure 2:
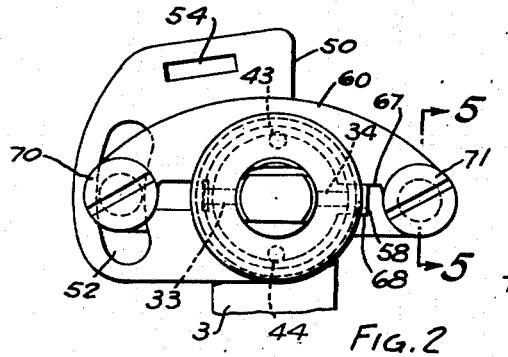
Fig. 2 is an end elevational view showing the valve in "off" position.
Figure 3:
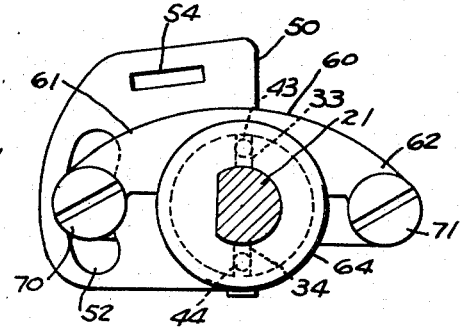
Fig. 3 is a view similar to Fig. 2 showing the stem in section with the valve member positioned in the full "on" position.
Figure 4:
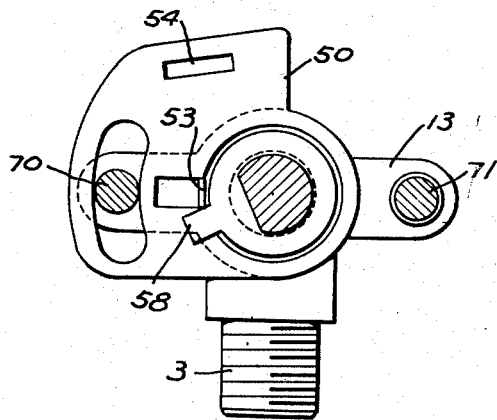
Fig. 4 is a view similar to Fig. 2 with the cap removed and showing some parts in section illustrating the valve in simmer position.
Figure 5:
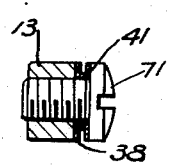
Fig. 5 is a sectional view taken substantially on line 5—5 of Fig. 2 showing a feature of construction.

When the valve is in "off" position, as shown in Figs. 1 and 2, the finger 58 abuts the limit stop shoulder 67 on the cap. The spring 55 urges the washer 56 to the right, as Fig. 1 is viewed, and thus the finger or extension 58 lies in the recess 66 and the valve cannot be turned because the finger is engaged between the shoulder 67 and shoulder 68. In this position, the ports are relatively positioned, as shown in Fig. 7. Also, the recesses 33 and 34 are displaced relative to the protrusions or teats 43 or 44 and the click plate. As shown in Fig. 2, this displacement is about 90°. To turn the valve to "on" position, the valve member is rotated clockwise, as Fig. 2 is viewed, and in this movement the click washer 32 turns while frictionally engaging the teats 43 and 44. Eventually the grooves 33 and 34 begin to come into registry with the teats 43 and 44 and the spring 30 snaps the washer 32 causing it to shift to the right with a snapping action as the teats 43 and 44 move in the grooves 33 and 34. The washer 32 has a slight looseness on the stem sufficient to effect this snapping action and create an audible indication. At this time the ports are in the full "on" position, as shown in Fig. 8. To turn the valve to a simmer flame or low flame position, the valve member is turned further clockwise until the finger 58 strikes the limit stop 53 on the adjusting washer 50. This position is shown in Fig. 4. At this time, the parts may be relatively positioned, as indicated in Fig. 9, with the tail port 17 registering with the inlet port 4.

Needless to say that when the ports are registered, as shown in Fig. 8, a full flow of gas passes through the port 16 into the passage 18 and through the outlet passage 6. When in the Fig. 9 position, a smaller supply of gas flows through the tail port 17 and thence through port 16, passage 18 and outlet passage 6, so as to cause a smaller flame to burn at the burner. The tail port gradually increases in size or depth from one end to the other and by varying the position of the valve member clockwise or counter-clockwise from the Fig. 9 position, a decrease or increase in the amount of gas supplied is effected.

To determine the size of the simmer flame, the adjusting plate 50 is adjustably positioned. This is done by loosening the screw 70 and then by turning the adjusting plate 50 until a proper flame is obtained, and then again tightening the screw 70 to bind the adjusting plate in position. In this way, the limit stop 53 is located to give the proper or desired low or simmer flame.

In gas ranges of modern construction, the controlling valves are pretty well concealed by covering panels. With this construction, however, a tool, such as a screw driver, can be passed with facility through an aperture in the panel for the loosening and tightening of the screw 70, and the screw driver may be placed into the aperture 54 for the rotatable adjustment of the plate 50. Thus, only one screw need to be loosened for adjustment purposes and the adjusting plate cannot be bound in position regardless of how strongly the screw 71 is tightened. The adjustment is made with great facility and without any binding action because the adjusting plate is rotatably mounted by the interfitting recess or cup formations 42 and 51.

The locking feature is, as above described, namely, that when the valve is in "off" position, the spring 55 shifts the washer 56 and the stem to the right so that the finger 58 lies in the locking recess 66. To turn the valve from "off" position, the stem must be pushed inwardly axially. In this action the shoulder 25 engages the washer 56 and shifts the washer inwardly to displace the finger 58 from the locking recess 66 and then the valve member may be rotated. After initial rotation the pressure for shifting the stem inwardly may be relieved and the finger 58 then rides on the flange 65.

When in "off" position, the washer 32 rides on the apices of the teats 43 and 44. Also when the valve is in simmer position, the washer 32 rides on the apices of the teats 43 and 44. Thus, there is an audible indication in the full "on" position when the teats and recesses snap or click into engagement, and there is a positive stop in both the "off" position and the simmer position with the simmer position being adjustable as above described to determine the size of the simmer or low flame.

I claim:

1. A valve for controlling the flow of fuel gas to a gas burner comprising, a body having a valve chamber, a valve member rotatably seated in the chamber, an operating stem for the valve member, the body and valve member having ports arranged to be brought into and out of registry in different rotary positions of the valve member, a cap for closing the valve chamber and through which the stem extends, two oppositely positioned screws for securing the cap to the body, means having a projection turnable with the valve member and stem, a limit shoulder on the cap engageable by the projection when ports are out of registry, an adjusting plate with a limit stop thereon for engaging the projection when a port in the valve member and a port in the body are in registry, said adjusting plate being positioned under the cap and having a part positioned between the cap and body at the location of one of said screws, the part having an elongated slot for said screw, and means providing a boss between the body and the cap through which the other screw passes.

2. A valve for controlling the flow of fuel gas to a gas burner comprising, a body having a valve chamber, a valve member rotatably seated in the chamber, an operating stem for the valve member, the body and valve member having ports arranged to be brought into and out of registry in different rotary positions of the valve member, a cap for closing the valve chamber and through which the stem extends, said cap having oppositely extending wings, screws passing through the wings and into the body for securing the cap to the body, a projection turnable with the valve member, a limit shoulder on the cap engageable by the projection when ports are out of registry, an adjusting plate with a limit stop thereon for engaging the projection when a port in the valve member and a port in the body are in registry, said adjusting plate being turnable substantially on the axis of the valve member and having a part underlying only one wing of the cap so that the tightening of the cap clamps the plate in adjusted position, and means providing a boss between the body and the opposite wing of the cap, said boss having a dimension measured axially of the valve member which is substantially equal to the thickness of the adjusting plate.

3. A valve for controlling the flow of fuel gas to a gas burner comprising, a body having a valve member, a valve member rotatably seated in the chamber, an operating stem for the valve member, the body and valve member having ports arranged to be brought into and out of registry in different rotary positions of the valve member, a cap for closing the valve chamber and through which the stem extends, said cap having oppositely extending wings, screws passing through the wings and into the body for securing the cap to the body, a projection turnable with the valve member, a limit shoulder on the cap engageable by the projection when ports are out of registry, an adjusting plate with a limit stop thereon for engaging the projection when a port in the valve member and a port in the body are in registry, said adjusting plate being positioned under the cap and having a part which underlies only one of the wings on the cap, another plate positioned between the body and the adjusting plate, said adjusting plate being rockably mounted on said other plate, the said other plate having apertures therein for said screws and the said part of the adjusting plate having an elongated aperture for one screw, and a boss on the other plate extending around the aperture for the other screw, said boss having an axial dimension substantially equal to the thickness of the adjusting plate.

4. A valve for controlling the flow of fuel gas to a gas burner comprising, a body having a valve member, a valve member rotatably seated in the chamber, an operating stem for the valve member, the body and valve member having ports arranged to be brought into and out of registry in different rotary positions of the valve member, a cap for closing the valve chamber and through which the stem extends, said cap having oppositely extending wings, screws passing through the wings and into the body for securing the cap to the body, a projection turnable with the valve member, a limit shoulder on the cap engageable by the projection when ports are out of registry, an adjusting plate with a limit stop thereon for engaging the projection when a port in the valve member and a port in the body are in registry, said adjusting plate being positioned under the cap and having a part which underlies only one of the wings on the cap, another plate positioned between the body and the adjusting plate, the adjusting plate and other plate having interfitting depressions for the rockable mounting of the adjusting plate, the said other plate having apertures therein for said screws and the said part of the adjusting plate having an elongated aperture for one screw, and a boss on the other plate extending around the aperture for the other screw, said boss having an axial dimension substantially equal to the thickness of the adjusting plate.

5. The valve structure as defined in claim 2 characterized in that the stem is non-rotatably and slidably mounted on the valve member, a washer non-rotatably and slidably mounted on the stem and carrying said projection, a spring positioned between the adjusting plate and the washer and urging said washer against the inside of the cap, said cap having a recess for receiving the projection to lock the stem against rotation when ports are out of registry, said projection being releasable from the recess by axial movement of the stem.

6. A valve for controlling the flow of fuel gas to a gas burner comprising, a body having a valve chamber, a valve member rotatably seated in the chamber, an operating stem for the valve member, the body and valve member having ports arranged to be brought into and out of registry in different rotary positions of the valve member, a cap for the body and through which the stem extends, circumferentially spaced screws for securing the cap to the body, means having a projection turnable with the valve member, a limit shoulder engageable by the projection when the valve member is in one rotary position and serving to limit the rotary movement of the valve member, a stop member having a limit stop thereon engageable by the projection when the valve member is in another rotary position and serving to limit rotary movement of the valve member, said stop member being positioned under the cap and mounted for adjustment relative to the body and having a part located between the cap and the body, which part is positioned to be clamped between the cap and body by one of said screws to hold the stop member in adjusted position, and spacing means for spacing the cap and the body adjacent another of the screws, whereby said stop member is free of clamping action by said other screw.

7. A valve for controlling the flow of fuel gas to a gas burner comprising, a body having a valve chamber, a valve member rotatably seated in the chamber, an operating stem for the valve member, the body and valve member having ports arranged to be brought into and out of registry in different rotary positions of the valve member, a cap for the body and through which the stem extends, circumferentially spaced screws for securing the cap to the body, means having a projection turnable with the valve member, a limit shoulder engageable by the projection when the valve member is in one rotary position and serving to limit the rotary movement of the valve member, a stop member having a limit stop thereon engageable by the projection when the valve member is in another rotary position and serving to limit rotary movement of the valve member, said stop member being positioned under the cap and mounted for adjustment relative to the body and having a part located between the cap and the body, which part is positioned to be clamped between the cap and body by one of said screws to hold the stop member in adjusted position, and spacing means for spacing the cap and the body adjacent another of the screws, whereby said stop member is free of clamping action by said other screw, said spacing means having a dimension measured axially of the valve member substantially equal to the thickness of the part of the said stop member which is positioned to be clamped by the said one screw.

References Cited in the file of this patent

UNITED STATES PATENTS

| Number | Name | Date |
|---|---|---|
| 2,020,414 | Herbster | Nov. 12, 1935 |
| 2,491,239 | Wildern | Dec. 13, 1949 |
| 2,592,056 | Mueller | Apr. 8, 1952 |